(12) United States Patent
Zhong et al.

(10) Patent No.: US 11,314,823 B2
(45) Date of Patent: Apr. 26, 2022

(54) METHOD AND APPARATUS FOR EXPANDING QUERY

(71) Applicant: Baidu Online Network Technology (Beijing) Co., Ltd., Beijing (CN)

(72) Inventors: Huiqiang Zhong, Beijing (CN); Cunxiang Yin, Beijing (CN); Jianping Shen, Beijing (CN); Guoqiang Xu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 392 days.

(21) Appl. No.: 16/052,414

(22) Filed: Aug. 1, 2018

(65) Prior Publication Data

US 2019/0095537 A1 Mar. 28, 2019

(30) Foreign Application Priority Data

Sep. 22, 2017 (CN) .......................... 201710867794.5

(51) Int. Cl.
| | | |
|---|---|---|
| *G06F 16/30* | (2019.01) | |
| *G06F 16/9535* | (2019.01) | |
| *G06F 16/56* | (2019.01) | |
| *G06F 16/9032* | (2019.01) | |
| *G06F 16/00* | (2019.01) | |

(52) U.S. Cl.
CPC .......... *G06F 16/9535* (2019.01); *G06F 16/56* (2019.01); *G06F 16/90328* (2019.01)

(58) Field of Classification Search
None
See application file for complete search history.

(56) References Cited

U.S. PATENT DOCUMENTS

| | | | | |
|---|---|---|---|---|
| 5,983,237 | A * | 11/1999 | Jain | G06F 16/58 |
| 8,463,830 | B2 * | 6/2013 | Criou | G06F 16/9535 |
| | | | | 707/899 |
| 9,098,571 | B2 * | 8/2015 | Achuthan | G06F 16/3349 |
| 9,659,248 | B1 * | 5/2017 | Barbosa | G06F 40/40 |
| 10,089,580 | B2 * | 10/2018 | Shan | G06N 5/022 |

(Continued)

OTHER PUBLICATIONS

Hang Cui, Ji-Rong Wen, Jian-Yun Nie, and Wei-Ying Ma "Query Expansion by Mining User Logs", Jul. 15, 2002, IEEE (Year: 2002).*

*Primary Examiner* — Polina G Peach
(74) *Attorney, Agent, or Firm* — Seed IP Law Group LLP

(57) ABSTRACT

The present disclosure discloses a method and apparatus for expanding a query. The method comprises: calculating an image click characteristic vector of a target query based on an image click log associated with the target query; finding a similar query of the target query based on the image click characteristic vector, to obtain a candidate expansion query set of the target query; matching the target query and each candidate expansion query in the candidate expansion query set with a knowledge graph, to extract an entity word and a qualifier of the target query and an entity word and a qualifier of the each candidate expansion query; expanding the entity words and the qualifiers of the target query and the each candidate expansion query in combination with the knowledge graph; and matching using expansion results of the entity words and the qualifiers, to determine an expanded query of the target query.

15 Claims, 4 Drawing Sheets

(56) References Cited

U.S. PATENT DOCUMENTS

| | | | |
|---|---|---|---|
| 2003/0217052 A1* | 11/2003 | Rubenczyk | G06F 16/3323 |
| 2004/0230410 A1* | 11/2004 | Harless | G10L 15/26 |
| | | | 703/6 |
| 2005/0283473 A1* | 12/2005 | Rousso | G06F 16/3322 |
| 2006/0106793 A1* | 5/2006 | Liang | G06F 16/3338 |
| 2006/0224583 A1* | 10/2006 | Fikes | G06F 16/9535 |
| 2008/0205775 A1* | 8/2008 | Brinker | G06F 16/353 |
| | | | 382/225 |
| 2009/0012778 A1* | 1/2009 | Feng | G06F 16/3338 |
| | | | 704/9 |
| 2010/0198857 A1* | 8/2010 | Metzler | G06Q 30/02 |
| | | | 707/768 |
| 2010/0241597 A1* | 9/2010 | Chen | G06Q 30/02 |
| | | | 706/12 |
| 2013/0018895 A1* | 1/2013 | Harless | G10L 15/1822 |
| | | | 707/748 |
| 2013/0018900 A1* | 1/2013 | Cheng | G06F 7/00 |
| | | | 707/755 |
| 2015/0067476 A1* | 3/2015 | Song | G06F 16/285 |
| | | | 715/234 |
| 2015/0088859 A1* | 3/2015 | Weissl | G06F 16/9535 |
| | | | 707/722 |
| 2016/0027037 A1* | 1/2016 | Cai | G06Q 30/0243 |
| | | | 705/14.42 |
| 2016/0140232 A1* | 5/2016 | Smirnov | G06F 16/3338 |
| | | | 707/768 |
| 2016/0162779 A1* | 6/2016 | Marcus | G06N 20/10 |
| | | | 706/12 |
| 2018/0046649 A1* | 2/2018 | Dal Mutto | G06F 16/41 |
| 2018/0060421 A1* | 3/2018 | Castelli | G06N 20/00 |
| 2018/0107917 A1* | 4/2018 | Hewavitharana | G06F 16/23 |

* cited by examiner

METHOD AND APPARATUS FOR EXPANDING QUERY

CROSS-REFERENCE TO RELATED APPLICATION

This application is related to and claims priority from Chinese Application No. 201710867794.5, filed on Sep. 22, 2017 and entitled "Method and Apparatus for Expanding Query," the entire disclosure of which is hereby incorporated by reference.

TECHNICAL FIELD

The present disclosure relates to the field of computer technology, specifically to the field of Internet technology, and more specifically to a method and apparatus for expanding a query.

BACKGROUND

As the Internet technology develops, more and more Internet data are produced. A search engine is an important means for a user to acquire the Internet data. When the user inputs a query keyword, the search engine generates a query according to the keyword, and retrieves information required by the user from the massive Internet data.

Generally, the search engine may expand the query according to the query keyword inputted by the user to recommend queries with high correlations, or directly expand the query to a query with a high correlation to query, so as to efficiently provide required information for the user. The existing approach for expanding the query is usually based on a preset query database, and in the query database, an associated query of each query is set. After the query is generated according to the query keyword inputted by the user, the associated query is queried from the preset query database. However, this approach is dependent on the query database set based on experience, and cannot effectively guarantee a correlation between the query and the expanded query. Moreover, the richness and the diversity of the expanded queries need to be improved.

SUMMARY

Embodiments of the present disclosure provide a method and apparatus for expanding a query to solve one or more technical problems mentioned in the foregoing background section.

In a first aspect, the embodiments of the present disclosure provide a method for expanding a query. The method includes: calculating an image click characteristic vector of a target query based on an acquired image click log associated with the target query; finding, in a preset query set, a similar query of the target query based on the image click characteristic vector of the target query, to obtain a candidate expansion query set of the target query; matching the target query and each candidate expansion query in the candidate expansion query set with an entity word and a qualifier in a knowledge graph, to extract an entity word and a qualifier of the target query and an entity word and a qualifier of the each candidate expansion query; expanding the entity word and the qualifier of the target query, and the entity word and the qualifier of the each candidate expansion query in combination with the knowledge graph; and matching using expansion results of the entity word and the qualifier of the target query and the entity word and the qualifier of the each candidate expansion query, to determine an expanded query of the target query from the candidate expansion query set.

In some embodiments, the calculating an image click characteristic vector of a target query based on an acquired image click log associated with the target query includes: counting numbers of clicks on images associated with the target query in each preset time window based on the acquired image click log associated with the target query; and sanitizing a number of clicks less than a preset click threshold in a counting result, and constructing the image click characteristic vector based on sanitized numbers of clicks on the images associated with the target query in the each preset time window after the sanitizing.

In some embodiments, the finding, in a preset query set, a similar query of the target query based on the image click characteristic vector of the target query to obtain a candidate expansion query set of the target query includes: counting, for each query in the preset query set, a number of clicks on an image associated with the query to construct an image click characteristic vector of the each query in the preset query set; calculating a similarity between the image click characteristic vector of the each query in the preset query set and the image click characteristic vector of the target query; and using a query corresponding to an image click characteristic vector having a similarity to the image click characteristic vector of the target query greater than a preset similarity threshold as a candidate expansion query to form the candidate expansion query set.

In some embodiments, the matching the target query and each candidate expansion query in the candidate expansion query set with an entity word and a qualifier in a knowledge graph to extract an entity word and a qualifier of the target query and an entity word and a qualifier of the each candidate expansion query includes: performing word segmentation on the target query and the each candidate expansion query in the candidate expansion query set; matching words obtained by the word segmentation with the entity word in the knowledge graph to obtain the entity word of the target query and the entity word of the each candidate expansion query; and matching the words obtained by the word segmentation with a qualifier of the entity word in the knowledge graph to obtain the qualifier of the target query and the qualifier of the each candidate expansion query.

In some embodiments, the expanding the entity word and the qualifier of the target query, and the entity word and the qualifier of the each candidate expansion query in combination with the knowledge graph includes: expanding the entity word of the target query and the entity word of the each candidate expansion query based on a knowledge structure relation between different entity words in the knowledge graph, to obtain an expanded entity word of the target query and an expanded entity word of the each candidate expansion query; and matching the qualifier of the target query and the qualifier of the each candidate expansion query with an associated qualifier set constructed based on the knowledge structure relation in the knowledge graph, to obtain an expanded qualifier of the target query and an expanded qualifier of the each candidate expansion query.

In some embodiments, the knowledge graph includes knowledge graphs of a plurality of domain categories. The expanding the entity word and the qualifier of the target query, and the entity word and the qualifier of the each candidate expansion query in combination with the knowledge graph further includes: determining a target domain category of the knowledge graph matching the entity word of the target query and the entity word of the each candidate expansion query. The expanding the entity word of the target query and the entity word of the each candidate expansion query based on a knowledge structure relation between different entity words in the knowledge graph includes: expanding the entity word of the target query and the entity word of the each candidate expansion query based on a knowledge structure relation between different entity words in the knowledge graph of the target domain category. The matching the qualifier of the target query and the qualifier of the each candidate expansion query with an associated qualifier set constructed based on the knowledge structure relation in the knowledge graph includes: matching the qualifier of the target query and the qualifier of the each candidate expansion query with the associated qualifier set constructed based on the knowledge structure relation in the knowledge graph of the target domain category.

In some embodiments, the matching using expansion results of the entity word and the qualifier of the target query and the entity word and the qualifier of the each candidate expansion query to determine an expanded query of the target query from the candidate expansion query set includes: using a candidate expansion query having an entity word identical to the expanded entity word of the target query and/or a qualifier identical to the expanded qualifier of the target query in the candidate expansion query set as the expanded query of the target query.

In a second aspect, the embodiments of the present disclosure provide an apparatus for expanding a query. The apparatus includes: a calculating unit, configured to calculate an image click characteristic vector of a target query based on an acquired image click log associated with the target query; a finding unit, configured to find, in a preset query set, a similar query of the target query based on the image click characteristic vector of the target query, to obtain a candidate expansion query set of the target query; an extracting unit, configured to match the target query and each candidate expansion query in the candidate expansion query set with an entity word and a qualifier in a knowledge graph, to extract an entity word and a qualifier of the target query and an entity word and a qualifier of the each candidate expansion query; an expanding unit, configured to expand the entity word and the qualifier of the target query, and the entity word and the qualifier of the each candidate expansion query in combination with the knowledge graph; and a matching unit, configured to match using expansion results of the entity word and the qualifier of the target query, and the entity word and the qualifier of the each candidate expansion query, to determine an expanded query of the target query from the candidate expansion query set.

In some embodiments, the calculating unit is further configured to calculate the image click characteristic vector of the target query by means of: counting numbers of clicks on images associated with the target query in each preset time window, based on the acquired image click log associated with the target query;

and sanitizing a number of clicks less than a preset click threshold in a counting result, and constructing the image click characteristic vector based on sanitized numbers of clicks on the images associated with the target query in the each preset time window after the sanitizing.

In some embodiments, the finding unit is further configured to find, in the preset query set, the similar query of the target query to obtain the candidate expansion query set of the target query by means of: counting, for each query in the preset query set, a number of clicks on an image associated with the query, to construct an image click characteristic vector of the each query in the preset query set; calculating a similarity between the image click characteristic vector of the each query in the preset query set and the image click characteristic vector of the target query; and using a query corresponding to an image click characteristic vector having a similarity to the image click characteristic vector of the target query greater than a preset similarity threshold as a candidate expansion query to form the candidate expansion query set.

In some embodiments, the extracting unit is further configured to extract the entity word and the qualifier of the target query and the entity word and the qualifier of the each candidate expansion query by means of: performing word segmentation on the target query and the each candidate expansion query in the candidate expansion query set; matching words obtained by the word segmentation with the entity word in the knowledge graph to obtain the entity word of the target query and the entity word of the each candidate expansion query; and matching the words obtained by the word segmentation with a qualifier of the entity word in the knowledge graph to obtain the qualifier of the target query and the qualifier of the each candidate expansion query.

In some embodiments, the expanding unit is further configured to expand the entity word and the qualifier of the target query, and the entity word and the qualifier of the each candidate expansion query in combination with the knowledge graph by means of: expanding the entity word of the target query and the entity word of the each candidate expansion query based on a knowledge structure relation between different entity words in the knowledge graph, to obtain an expanded entity word of the target query and an expanded entity word of the each candidate expansion query; and matching the qualifier of the target query and the qualifier of the each candidate expansion query with an associated qualifier set constructed based on the knowledge structure relation in the knowledge graph, to obtain an expanded qualifier of the target query and an expanded qualifier of the each candidate expansion query.

In some embodiments, the knowledge graph includes knowledge graphs of a plurality of domain categories. The expanding unit is further configured to determine a target domain category of the knowledge graph matching the entity word of the target query and the entity word of the each candidate expansion query. The expanding unit is further configured to expand the entity word of the target query and the entity word of the each candidate expansion query by means of: expanding the entity word of the target query and the entity word of the each candidate expansion query based on a knowledge structure relation between different entity words in the knowledge graph of the target domain category. The expanding unit is further configured to match the qualifier of the target query and the qualifier of the each candidate expansion query with an associated qualifier set constructed based on the knowledge structure relation in the knowledge graph by means of: matching the qualifier of the target query and the qualifier of the each candidate expansion query with the associated qualifier set constructed based on the knowledge structure relation in the knowledge graph of the target domain category.

According to the method and apparatus for expanding a query provided by the present disclosure, first, the image click characteristic vector of the target query is calculated based on the acquired image click log associated with the target query. Then, in the preset query set, the similar query of the target query is found based on the image click characteristic vector of the target query, to obtain the candidate expansion query set of the target query. Next, the target query and the each candidate expansion query in the candidate expansion query set are matched with the entity word and the qualifier in the knowledge graph, to extract the entity word and the qualifier of the target query and the entity word and the qualifier of the each candidate expansion query. Then, the entity word and the qualifier of the target query and the entity word and the qualifier of the each candidate expansion query are expanded in combination with the knowledge graph. Finally, the matching is performed using the expansion results of the entity word and the qualifier of the target query and the entity word and the qualifier of the each candidate expansion query, to determine the expanded query of the target query from the candidate expansion query set. Therefore, the correlation between the expanded query and the to-be-expanded target query can be effectively ensured. Meanwhile, the richness and diversity of the expanded query are increased, which helps to provide more accurate query results.

BRIEF DESCRIPTION OF THE DRAWINGS

After reading detailed descriptions of non-limiting embodiments given with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
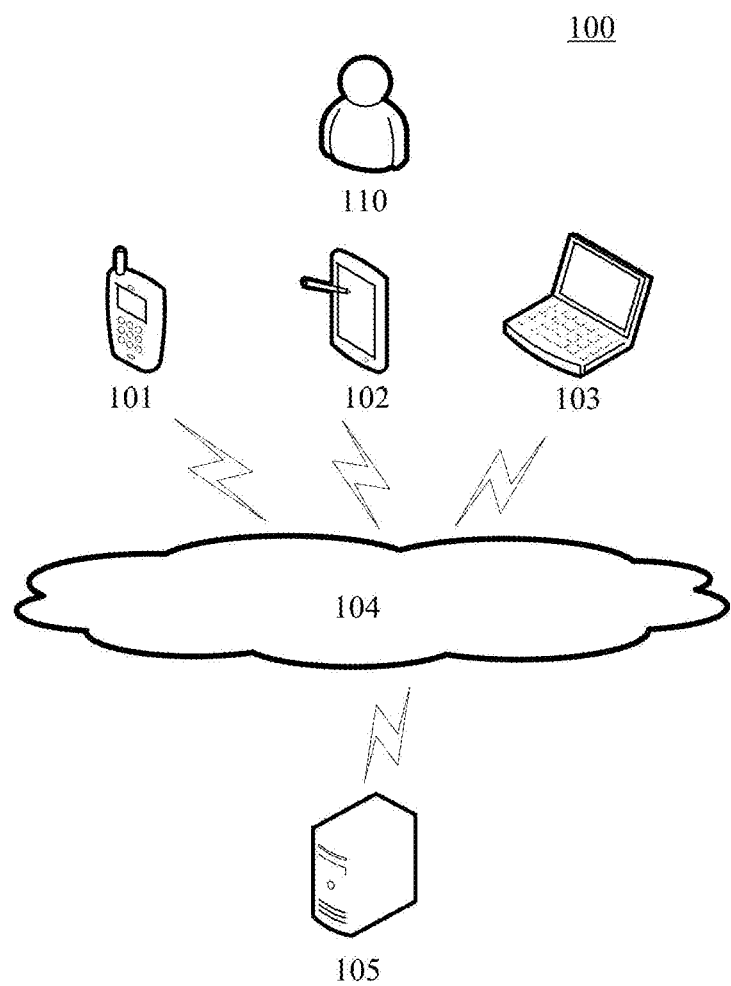
FIG. 1 is an architecture diagram of an exemplary system in which the present disclosure may be applied.

FIG. 1 shows an exemplary system architecture diagram in which the present disclosure may be applied.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user 110 may use the terminal devices 101, 102 and 103 to interact with the server 105 through the network 104, in order to receive or transmit messages, etc. Various information acquiring applications, such as web browser applications, search applications, and social platform software may be installed on the terminal devices 101, 102 and 103.

The terminal devices 101, 102 and 103 may be various electronic devices having display screens and supporting Internet access, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The server 105 maybe a server providing various services, for example, a backend webpage server that responses to a search request submitted by the terminal device. The backend webpage server may perform processing including parsing the search request to obtain a search word, generating a query based on the search word and querying using the query, and return a processing result to the terminal devices 101, 102 and 103.

It should be noted that the method for expanding a query according to the embodiments of the present disclosure may be executed by the server 105. Accordingly, an apparatus for expanding a query is generally installed on the server 105.

It should be appreciated that the numbers of the terminal devices, the networks and the servers in FIG. 1 are merely illustrative. Any number of terminal devices, networks and servers may be provided based on the actual requirements.

Figure 2:
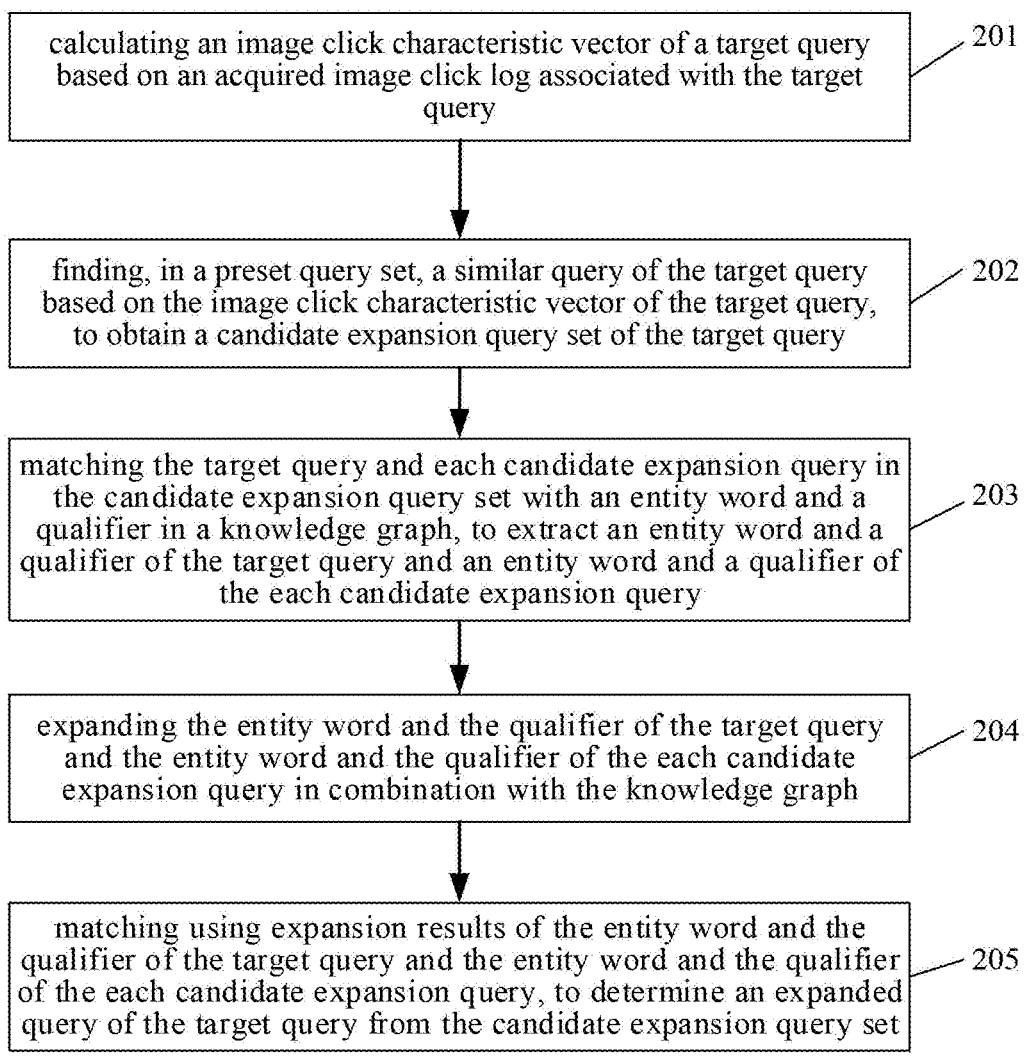
FIG. 2 is a flowchart of an embodiment of a method for expanding a query according to the present disclosure.

Further referring to FIG. 2, FIG. 2 illustrates a flow 200 of an embodiment of a method for expanding a query according to the present disclosure. The method for expanding a query includes the following steps.

Step 201, calculating an image click characteristic vector of a target query based on an acquired image click log associated with the target query.

In this embodiment, an electronic device on which the method for expanding a query is performed may first acquire the image click log associated with the target query. Herein, the target query is a to-be-expanded query. The query may be a query generated according to a query keyword inputted in a search box by a user, and may also be a query being in a pre-collected or pre-generated query set and stored in a search engine or other backend servers providing data query services.

The query may be a command expression used for querying information and composed of a query keyword, a logical operator, a wildcard, etc. For example, a query "watch and child" includes query keywords "watch" and "child," and a logical operator "and" representing a relation of "and." In general, when the user inputs the query keyword in the search box or selects the query keyword in a page, a browser or the search engine may automatically generate a query including the query keyword, and may add the query to the above query set.

In this embodiment, the electronic device may acquire a click log of each image in an image search result of the image search performed by the user using the target query, and then generate the image click characteristic vector of the query according to the image click log. The image in the image search result of the image search performed by the user using the target query is the image associated with the target query. The image click characteristic vector may be a vector characterizing characteristics such as a frequency of clicks and a number of clicks on the image by a network user. Specifically, the image click characteristic vector may be a vector consisting of a number of clicks on each image in a period of time.

Specifically, the electronic device may count a number of clicks or a frequency of clicks on each image in a set period of time T according to the acquired image click log associated with the target query, and use images as elements in the image click characteristic vector and corresponding frequencies of clicks or corresponding numbers of clicks as values of the elements in the image click characteristic vector, thereby generating the image click characteristic vector. The image click characteristic vector generated using the image click log can describe characteristics of the target query more accurately, and then can ensure a good correlation in the subsequent expansion of the query.

In some alternative implementations of this embodiment, the calculating an image click characteristic vector of a target query based on an acquired image click log associated with the target query may include: counting numbers of clicks on images associated with the target query in each preset time window, based on the acquired image click log associated with the target query; and sanitizing a number of clicks less than a preset click threshold in a counting result, and constructing the image click characteristic vector based on sanitized numbers of clicks on the images associated with the target query in the each preset time window after the sanitizing.

Specifically, in the alternative implementations, a plurality of time windows may be preset. Each preset time window is a set period of time, and adjacent time windows may be two consecutive periods of time in time. A time length of the each preset time window may be the same or different. Then, the number of clicks on each image in the each preset time window is counted according to the acquired image click log associated with the target query. A too small numerical value in the counting result may be generated due to a casual click or invalid click of the user, and the value may be cleaned out. Specifically, a number of clicks less than the preset click threshold may be reset to 0. Accordingly, a number of clicks having no reliability may be filtered out, which makes the image click characteristic vector of the target query more accurate. Afterwards, the image click characteristic vector may be constructed using each image in the each preset time window and the corresponding number of clicks.

Alternatively, the image click characteristic vector may be a two-dimensional vector, where one dimension represents the time window and the other dimension represents the image. A value of each element in the vector is the counting result of the number of clicks on the image. As an example, if the search result of the image search performed using the target query includes an image A and an image B, counting values of numbers of clicks on the image A and the image B in a first preset time window (t1, t2) are respectively 100 and 300, and counting values of numbers of clicks on the image A and the image B in a second preset time window (t2, t3) are respectively 200 and 400, an image click vector X may be constructed as the expression (1):

$$X = \begin{bmatrix} 100 & 200 & \dots \\ 300 & 400 & \dots \\ \dots & \dots & \dots \end{bmatrix}, \quad (1).$$

The column vector represents the numbers of clicks on different images in the same preset time window, and the row vector represents the numbers of clicks on the same image in different preset time windows. The first column of the first row is the number of clicks on the image A in the first preset time window (t1, t2). The second column of the first row is the number of clicks on the image A in the second preset time window (t2, t3). The first column of the second row is the number of clicks on the image B in the first preset time window (t1, t2). The second column of the second row is the number of clicks on the image B in the second preset time window (t2, t3). The suspension points " . . . " represent corresponding numbers of clicks on other images in other preset time windows. Accordingly, the image click characteristic vector of the target query may be constructed using records of clicks on images in the image search result of the user.

Step 202, finding, in a preset query set, a similar query of the target query based on the image click characteristic vector of the target query, to obtain a candidate expansion query set of the target query.

The preset query set maybe a set containing a large number of queries collected by the electronic device. When the user queries data, the electronic device may record a generated query into the preset query set.

In this embodiment, the calculated image click characteristic vector of the target query may be used as a characteristic of the target query. A similarity between the characteristic of the target query and a characteristic of each query in the preset query set is calculated. The candidate expansion query set of the target query is selected from the preset query set according to the similarity.

Specifically, the characteristic of the each query in the preset query set may also be represented using an image click characteristic vector. The image click characteristic vector of the each query in the preset query set may be pre-generated and associated with the query to be stored in the electronic device. The similarity between the image click characteristic vectors of the each query in the preset query set and the target query may be calculated to be used as the similarity between the each query in the preset query set and the target query. Then, a query having a similarity higher than a set threshold is screened out as the similar query of the target query, and the similar query is added into the candidate expansion query set of the target query.

In some alternative implementations of this embodiment, step 202 may be implemented according to the following steps.

First, for the each query in the preset query set, the number of clicks on the image associated with the query is counted, to construct the image click characteristic vector of the each query in the preset query set.

Specifically, the image click characteristic vector of the each query in the preset query set may be constructed in the same way as the image click characteristic vector of the target query is constructed. When constructing the image click characteristic vector of the each query in the preset query set, the number of clicks on each image in the image search result of the each query in the each preset time window may be counted using the same preset time window as constructing the image click characteristic vector of the target query, to form the image click characteristic vector of the each query.

Alternatively, the image click characteristic vector of the each query may be calculated using a Map Reduce framework to improve the calculation efficiency.

Then, the similarity between the image click characteristic vector of the each query in the preset query set and the image click characteristic vector of the target query is calculated.

Specifically, the similarity between the image click characteristic vectors of the each query in the preset query set and the target query may be calculated using a plurality of similarity calculation methods, for example, a cosine similarity and a Pearson correlation coefficient. Alternatively, the similarity is calculated using a user-based Collaborative Filtering algorithm, and the similar query of the target query is determined.

Finally, the query corresponding to the image click characteristic vector having the similarity between this image click characteristic vector and the image click characteristic vector of the target query greater than the preset similarity threshold is used as the candidate expansion query to form the candidate expansion query set.

Herein, the preset similarity threshold may be an empirical value. If the similarity between the query in the preset query set and the target query is greater than the preset similarity threshold, the query may be used as the similar query of the target query and added to the candidate expansion query set.

Step 203, matching the target query and each candidate expansion query in the candidate expansion query set with an entity word and a qualifier in a knowledge graph, to extract an entity word and a qualifier of the target query and an entity word and a qualifier of the each candidate expansion query.

The target query and the each candidate expansion query in the candidate expansion query set may respectively include an entity word and a qualifier. The entity word is usually a noun or a pronoun, and the qualifier is usually an adjective, which is a word used to modify the entity word. In this embodiment, the target query and the corresponding candidate expansion query may be matched with an entity word and a qualifier in a constructed knowledge graph, to extract the entity word and the qualifier of the target query and the entity word and the qualifier of the each candidate expansion query.

The knowledge graph is a mapping graph for describing association relations between various entities and concepts in the real world. In the knowledge graph, the entities and the concepts may be nodes described using entity words. The association relations between the entities and the concepts may be represented by connection lines between the nodes and descriptive words. These descriptive words are qualifiers in the knowledge graph.

In this embodiment, by directly matching the target query and the candidate expansion query with an entity word of each node in the knowledge graph, it may be determined whether the target query or the candidate expansion query contains the entity word in the knowledge graph. If the entity word is contained, the entity word is extracted to be used as an entity word of a corresponding target query or candidate expansion query. Then, a part-of-speech analysis may be performed to determine whether the query contains a qualifier for modifying the extracted entity word. For example, when the extracted entity word is "car," it is determined that whether the query contains "advanced," "high-grade," "Benz," "Volkswagen" and other adjectives. If the adjectives are contained, it is determined that these adjectives are qualifiers used to define the entity word, and then the qualifier in the target query or candidate expansion query is extracted.

In some embodiments, the matching the target query and each candidate expansion query in the candidate expansion query set with an entity word and a qualifier in a knowledge graph, to extract an entity word and a qualifier of the target query and an entity word and a qualifier of the each candidate expansion query in step 203 may be performed by means of: performing word segmentation on the target query and the each candidate expansion query in the candidate expansion query set; matching words obtained by the word segmentation with the entity word in the knowledge graph to obtain the entity word of the target query and the entity word of the each candidate expansion query; and matching the words obtained by the word segmentation with a qualifier of the entity word in the knowledge graph to obtain the qualifier of the target query and the qualifier of the each candidate expansion query.

Specifically, first, the word segmentation may be performed on the target query and the candidate expansion query using a method such as a word segmentation method based on language statistics (e.g., a N-shortest path algorithm, and a hidden Markov Model) and a text based matching method (e.g., a forward maximum matching method, and a backward maximum matching method), to obtain words in the target query and the candidate expansion query.

Then, the word obtained after the word segmentation on the target query and the word obtained after the word segmentation on the candidate expansion query may be matched with the entity word in the knowledge graph. A successfully matched entity word is correspondingly determined as the entity word of the target query or the entity word of the candidate expansion query. Similarly, the word obtained after the word segmentation on the target query and the word obtained after the word segmentation on the candidate expansion query may be matched with the qualifier in the knowledge graph. A successfully matched qualifier is correspondingly determined as the qualifier of the target query or the qualifier of the candidate expansion query.

In some alternative implementations of this embodiment, when the entity word and the qualifier of the target query and the entity word and the qualifier of the candidate expansion query are extracted, a correspondence between the entity word and the qualifier may be simultaneously extracted. For example, when one query contains a plurality of entity words and a plurality of qualifiers, a qualifier used for defining each entity word may be respectively extracted, to combine the entity word and the qualifier used for defining the entity word into one word pair. Accordingly, the matching may be performed in combination with the correspondence between the entity word and the qualifier in the subsequent matching, which is conductive to improving the accuracy of the expanded query.

Step 204, expanding the entity word and the qualifier of the target query and the entity word and the qualifier of the each candidate expansion query in combination with the knowledge graph.

In this embodiment, in combination with the knowledge graph, the electronic device may expand the extracted entity word and qualifier of the target query and expand the extracted entity word and qualifier of the candidate expansion query. Specific expansion approaches may include, but not limited to, an approach to use an entity word having the same category attribute as the entity word of the target query or the candidate expansion query, or an entity word having a direct or indirect association relation with the entity word of the target query or the candidate expansion query in the knowledge graph as the entity word obtained after the expansion, and to use a word belonging to the same category as the qualifier of the target query or the qualifier of the candidate expansion query, or a word similar to the qualifier of the target query or the qualifier of the candidate expansion query in the knowledge graph as the qualifier obtained after the expansion.

In some alternative implementations of this embodiment, the expanding the entity word and the qualifier of the target query and the entity word and the qualifier of the each candidate expansion query in combination with the knowledge graph in step 204 may be performed by means of: first expanding the entity word of the target query and the entity word of the each candidate expansion query based on a knowledge structure relation between different entity words in the knowledge graph, to obtain an expanded entity word of the target query and an expanded entity word the each candidate expansion query; and then matching the qualifier of the target query and the qualifier of the each candidate expansion query with an associated qualifier set constructed based on the knowledge structure relation in the knowledge graph, to obtain an expanded qualifier of the target query and an expanded qualifier the each candidate expansion query. That is, for the entity word of the target query or the entity word of the candidate expansion query, the knowledge graph may be used to mine to use an entity word in the knowledge graph (e.g., entity words being sibling nodes with each other, and an entity word as a parent node or a child node) having a close structure relation with the entity word of the target query or the candidate expansion query as the expanded entity word. In addition, a word matching the qualifier of the target query or the candidate expansion query may be found out in a preset associated qualifier set to be used as the expanded qualifier.

Herein, the preset associated qualifier set may be constructed based on the knowledge structure relation in the knowledge graph. For example, if two qualifiers in the knowledge graph are close to each other, or two qualifiers in the knowledge graph are used to modify the same entity word, it may be determined that the two qualifiers are associated with each other. At this time, one of the qualifiers may be added to an associated qualifier set of the other qualifier. Alternatively, the associated qualifier set may include commodity brand qualifiers (e.g., Audi and Benz), geographic location qualifiers (e.g., "Beijing" and "Wangfujing"), article application scenario qualifiers (e.g., domestic and office), usage mode qualifiers (e.g., hand-held and push-pull), time qualifiers, and so on.

In a further embodiment, the knowledge graph may include knowledge graphs of a plurality of domain categories, that is, a plurality of vertical knowledge graphs. Each vertical knowledge graph is a graph representing an association relation between entities in a specific domain. Here, the domain category of the knowledge graph may include domains having large ranges such as the domain of real estate, the domain of tourism, the domain of shopping, the domain of architecture, the domain of art, and the domain of science and technology. The domain category of the knowledge graph may also include more detailed domains such as view spot, clothing accessories, shoes and hats, electronic and electrical products, automobiles, home decorations, and articles for daily use.

In these embodiments, the expanding the entity word and the qualifier of the target query and the entity word and the qualifier of the each candidate expansion query may be performed by means of: determining a target domain category of the knowledge graph matching the entity word of the target query and the entity word of the each candidate expansion query, expanding the entity word of the target query and the entity word of the each candidate expansion query based on a knowledge structure relation between different entity words in the knowledge graph of the target domain category, and matching the qualifier of the target query and the qualifier of the each candidate expansion query with an associated qualifier set constructed based on the knowledge structure relation in the knowledge graph of the target domain category.

That is, entity words matching the entity word extracted from the target query and the entity word extracted from the each candidate expansion query may be found in knowledge graphs of various domain categories, to determine a domain category of the knowledge graph where the matched entity word is located as the target domain category. Then, the entity word and the qualifier are expanded in the knowledge graph of the target domain category.

For example, if the target query contains an entity word "the Sun Yat-sen Mausoleum" and the entity word matches "the Sun Yat-sen Mausoleum" in a knowledge graph with a domain category of "view spot", the domain category represented by the "view spot" may be used as the target domain category. Then an entity word having a structure relation with "the Sun Yat-sen Mausoleum" in the knowledge graph of the "view spot" domain category is found to be used as the expanded entity word.

Further alternatively, the knowledge graph of the target domain category may include a plurality of sub-domain categories of knowledge graphs. For example, the view spot domain category may include sub view spot domain categories. When expanding the entity word and the qualifier, the expanding may be performed in knowledge graphs of all sub-domain categories of the target domain category.

Step 205, matching using expansion results of the entity word and the qualifier of the target query and the entity word and the qualifier of the each candidate expansion query, to determine an expanded query of the target query from the candidate expansion query set.

After the entity word and the qualifier of the target query and the entity word and the qualifier of the candidate expansion query are expanded, the expansion results of the target query and the candidate expansion query may be matched using the expansion results of the entity words and the qualifiers, to determine the expanded query of the target query.

Specifically, the entity word and expanded entity word of the target query may be aggregated to form an entity word set of the target query, and the qualifier and expanded qualifier of the target query may be aggregated to form a qualifier set of the target query. Similarities between the entity word and expanded entity word of the each candidate expansion query and the entity word in the entity word set of the target query are calculated, and similarities between the qualifier and expanded qualifier of the each candidate expansion query and the qualifier in the qualifier set of the target query are calculated. It is determined whether a corresponding candidate expansion query matches the target query based on the similarities. If they are matched with each other, the candidate expansion query is determined as the expanded query of the target query. Thus, an expanded query having a high correlation with the target query can be obtained.

In some alternative implementations of this embodiment, a candidate expansion query having an entity word identical to the expanded entity word of the target query and/or a qualifier identical to the expanded qualifier of the target query in the candidate expansion query set may be used as the expanded query of the target query. That is, if the entity word or expanded entity word of the candidate expansion query is identical to the expanded entity word of the target query, the candidate expansion query is determined as the expanded query of target query. If the qualifier or expanded qualifier of the candidate expansion query is identical to the expanded qualifier of the target query, the candidate expansion query is determined as the expanded query of target query.

An application scenario of the above embodiment of the present disclosure may be as follows: the search engine may expand queries collected by the backend, and expand each query to form a set containing a plurality of related queries. When the user queries based on one of the queries collected by the backend, the search engine may perform a search based on an expansion result of the query (i.e., the set containing a plurality of related queries), thereby providing more abundant and more diversified search results for the user.

Figure 3:
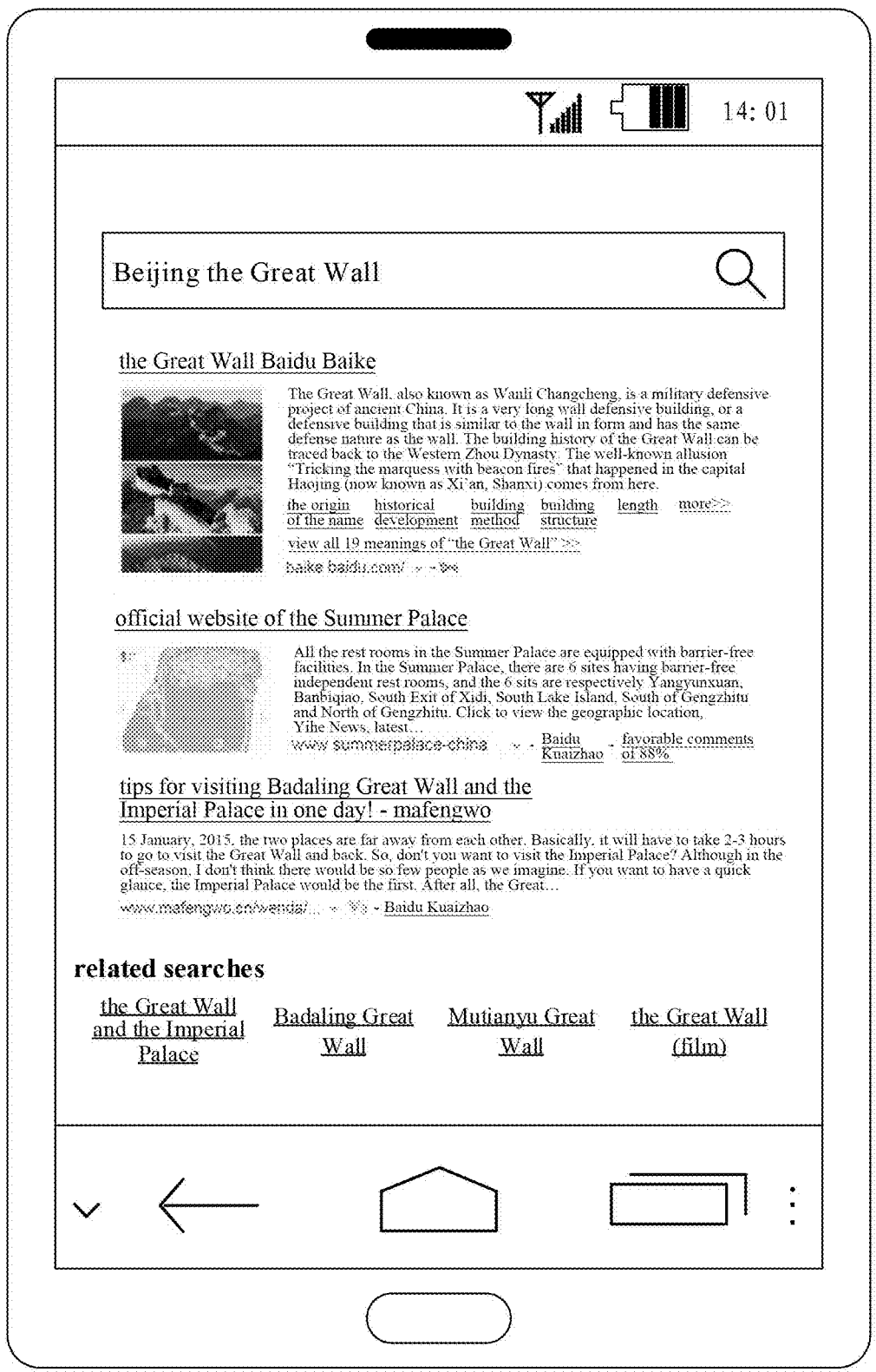
FIG. 3 is a schematic diagram of a principle of an application scenario of the method for expanding a query according to the present disclosure.

FIG. 3 is a schematic diagram of a principle of an application scenario of the method for expanding a query according to the present disclosure. As shown in FIG. 3, the search engine may expand according to the query "Beijing & the Great Wall," to obtain the expanded entity words "the Imperial Palace" and "the Summer Palace" through the entity word "the Great Wall," and obtain the expanded qualifiers "Badaling," "Mutianyu," etc. through the qualifier "Beijing," and may generate the expanded queries "Beijing & the Imperial Palace," "Beijing & the Summer Palace," "the Great Wall & the Imperial Palace," "the Great Wall & Badaling," "the Great Wall & Mutianyu" etc. in the backend. After the user types the query words "Beijing" and "the Great Wall" in the search box, the search engine may generate the query "Beijing & the Great Wall," and then display the query and search results of the expanded queries in a search result page. It may be seen that the user may acquire richer information in one query through the expanded query.

According to the method for expanding a query in the above embodiments of the present disclosure, the image click characteristic vector of the target query is calculated based on the acquired image click log associated with the target query. Then, in the preset query set, the similar query of the target query is found based on the image click characteristic vector of the target query, to obtain the candidate expansion query set of the target query. Next, the target query and the each candidate expansion query in the candidate expansion query set are matched with the entity word and the qualifier in the knowledge graph, to extract the entity word and the qualifier of the target query and the entity word and the qualifier of the each candidate expansion query. Then, the entity word and the qualifier of the target query and the entity word and the qualifier of the each candidate expansion query are expanded in combination with the knowledge graph. Finally, the matching is performed using the expansion results of the entity word and the qualifier of the target query and the entity word and the qualifier of the each candidate expansion query, to determine the expanded query of the target query from the candidate expansion query set. Therefore, the expansion of the query based on the image search results is implemented, which can improve the calculation efficiency. Meanwhile, the expanding of the entity words and the qualifiers performed in combination with the knowledge graph can effectively ensure the correlation between the expanded query and the to-be-expanded target query, and also increase the richness and diversity of the expanded query, which helps to provide more accurate query results to enhance the query efficiency for the user.

Figure 4:
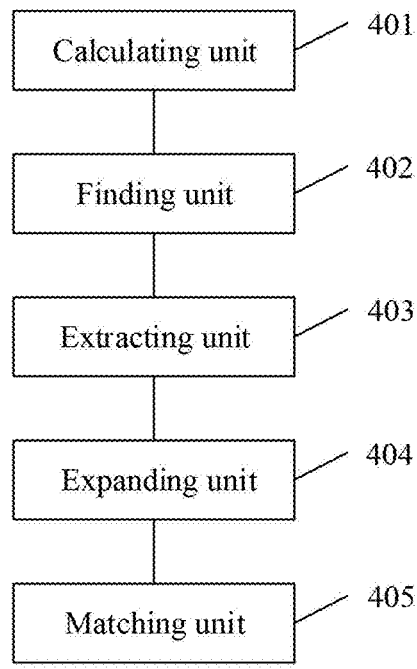
FIG. 4 is a schematic structural diagram of an embodiment of an apparatus for expanding a query according to the present disclosure.

Further referring to FIG. 4, as an implementation of the method, the present disclosure provides an embodiment of an apparatus for expanding a query.

As shown in FIG. 4, the apparatus for expanding a query 400 in this embodiment of the present disclosure may include: a calculating unit 401, a finding unit 402, an extracting unit 403, an expanding unit 404, and a matching unit 405. The calculating unit 401 is configured to calculate an image click characteristic vector of a target query based on an acquired image click log associated with the target query. The finding unit 402 is configured to find, in a preset query set, a similar query of the target query based on the image click characteristic vector of the target query, to obtain a candidate expansion query set of the target query. The extracting unit 403 is configured to match the target query and each candidate expansion query in the candidate expansion query set with an entity word and a qualifier in a knowledge graph, to extract an entity word and a qualifier of the target query and an entity word and a qualifier of the each candidate expansion query. The expanding unit 404 is configured to expand the entity word and the qualifier of the target query and the entity word and the qualifier of the each candidate expansion query in combination with the knowledge graph. The matching unit 405 is configured to match using expansion results of the entity word and the qualifier of the target query and the entity word and the qualifier of the each candidate expansion query, to determine an expanded query of the target query from the candidate expansion query set.

In this embodiment, the calculating unit 401 may count a number of clicks and a frequency of clicks on an image for a click log of each image in an image search result of the target query, and generate the image click characteristic vector of the target query according to the number of clicks. Alternatively, the number of clicks or the frequency of clicks on the image in each period of time may be used as the image click characteristic vector according to the number of clicks or the frequency of clicks on the image counted in the each period of time.

The finding unit 402 may calculate a similarity between each query in the preset query set and the target query using the image click characteristic vector as characteristic representation of the target query, and use a query having a similarity greater than a set threshold as the candidate expansion query. When calculating the similarity, the image click characteristic vector of the each query in the preset query set may be acquired, and the similarity between the image click characteristic vectors may be calculated using the cosine similarity, the Pearson correlation coefficient, etc., to be used as the similarity between the target query and the query in the preset query set. Alternatively, the similarity between the image click characteristic vectors of the query in the preset query set and the target query may be calculated using the user-based Collaborative Filtering algorithm.

The extracting unit 403 may extract the entity word and the qualifier of the target query from the target query and extract the entity word and the qualifier of the candidate expansion query from the candidate expansion query by means of word segmentation and matching with the entity word and the qualifier in the knowledge graph.

The expanding unit 404 may expand the entity word and the qualifier of the target query and the entity word and the qualifier of the candidate expansion query using a knowledge structure relation between entities in the knowledge graph. Specifically, the entity word may be expanded to an entity word in the knowledge graph associated with this entity word, and the qualifier of the entity word associated with this entity word in the knowledge graph may be used as an expanded qualifier.

The matching unit 405 may match the expanded entity word and the expanded qualifier of the candidate expansion query with the expanded entity word and the expanded qualifier of the target query. The successfully matched query is the expanded query of the target query.

In some embodiments, the calculating unit 401 may be further configured to calculate the image click characteristic vector of the target query by means of: counting numbers of clicks on images associated with the target query in each preset time window, based on the acquired image click log associated with the target query; and sanitizing a number of clicks less than a preset click threshold in a counting result, and constructing the image click characteristic vector based on the sanitized numbers of clicks on the images associated with the target query in the each preset time window after the sanitizing.

In some embodiments, the finding unit 402 may be further configured to find, in the preset query set, the similar query of the target query to obtain the candidate expansion query set of the target query by means of: counting, for each query in the preset query set, a number of clicks on an image associated with the query to construct an image click characteristic vector of the each query in the preset query set; calculating a similarity between the image click characteristic vector of the each query in the preset query set and the image click characteristic vector of the target query; and using a query corresponding to an image click characteristic vector having a similarity to the image click characteristic vector of the target query greater than a preset similarity threshold as the candidate expansion query to form the candidate expansion query set.

In some embodiments, the extracting unit 403 maybe further configured to extract the entity word and the qualifier of the target query and the entity word and the qualifier of the each candidate expansion query by means of: performing word segmentation on the target query and the each candidate expansion query in the candidate expansion query set; matching words obtained by the word segmentation with the entity word in the knowledge graph to obtain the entity word of the target query and the entity word of the each candidate expansion query; and matching the words obtained by the word segmentation with a qualifier of the entity word in the knowledge graph to obtain the qualifier of the target query and the qualifier of the each candidate expansion query.

In some embodiments, the expanding unit 404 may be further configured to expand the entity word and the qualifier of the target query and the entity word and the qualifier of the each candidate expansion query in combination with the knowledge graph by means of: expanding the entity word of the target query and the entity word of the each candidate expansion query based on a knowledge structure relation between different entity words in the knowledge graph, to obtain expanded entity words of the target query and the each candidate expansion query; and matching the qualifier of the target query and the qualifier of the each candidate expansion query with an associated qualifier set constructed based on the knowledge structure relation in the knowledge graph, to obtain an expanded qualifier of the target query and an expanded qualifier of the each candidate expansion query.

In further embodiments, the knowledge graph may include knowledge graphs of a plurality of domain categories. At this time, the expanding unit 404 may be further configured to determine a target domain category of the knowledge graph matching the entity word of the target query and the entity word of the each candidate expansion query. The expanding unit is further configured to expand the entity word of the target query and the entity word of the each candidate expansion query by means of: expanding the entity word of the target query and the entity word of the each candidate expansion query based on a knowledge structure relation between different entity words in the knowledge graph of the target domain category. The expanding unit 404 may be further configured to match the qualifier of the target query and the qualifier of the each candidate expansion query with an associated qualifier set constructed based on the knowledge structure relation in the knowledge graph by means of: matching the qualifier of the target query and the qualifier of the each candidate expansion query with the associated qualifier set constructed based on the knowledge structure relation in the knowledge graph of the target domain category.

In some embodiments, the matching unit 405 may be further configured to determine the expanded query of the target query from the candidate expansion query set by means of: using a candidate expansion query having an entity word identical to the expanded entity word of the target query and/or a qualifier identical to the expanded qualifier of the target query in the candidate expansion query set as the expanded query of the target query.

It should be understood that the units described in the apparatus 400 correspond to the steps in the method described with reference to FIG. 2. Thus, the operations and features described above with respect to the method are similarly applicable to the apparatus 400 and the units contained therein, which will not be repeatedly described.

The apparatus 400 for expanding a query provided by the embodiment of the present disclosure implements the expansion of the query, can effectively ensure the correlation between the expanded query and the to-be-expanded target query, and simultaneously enhance the richness and diversity of the expanded query.

Figure 5:
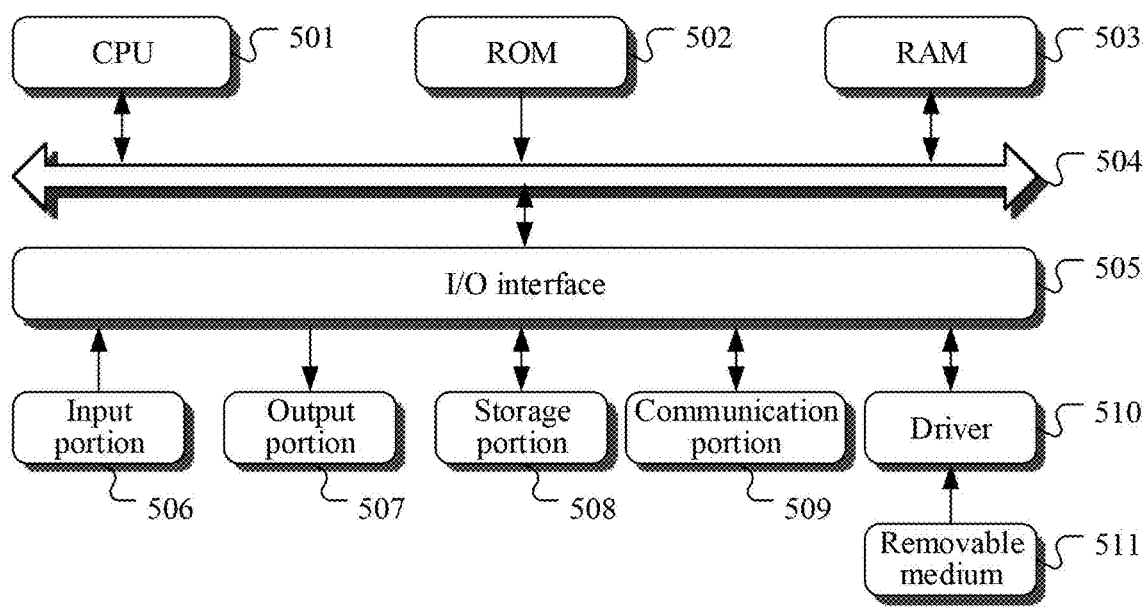
FIG. 5 is a schematic structural diagram of a computer system adapted to implement a server according to embodiments of the present disclosure.

Referring to FIG. 5, which is a schematic structural diagram of a computer system 500 adapted to implement a server according to embodiments of the present disclosure. The server shown in FIG. 5 is merely an example, and should not bring any limitations to the functions and the scope of use of the embodiments of the present disclosure.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 509, and/or may be installed from the removable media 511. The computer program, when executed by the central processing unit (CPU) 501, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that maybe implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, comprising a calculating unit, a finding unit, an extracting unit, an expanding unit and a matching unit, where the names of these units do not in some cases constitute a limitation to such units themselves. For example, the calculating unit may also be described as "a unit for calculating an image click characteristic vector of a target query based on an acquired image click log associated with the target query."

In another aspect, the present disclosure further provides a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by the apparatus, cause the apparatus to: calculating an image click characteristic vector of a target query based on an acquired image click log associated with the target query; finding, in a preset query set, a similar query of the target query based on the image click characteristic vector of the target query, to obtain a candidate expansion query set of the target query; matching the target query and each candidate expansion query in the candidate expansion query set with an entity word and a qualifier in a knowledge graph, to extract an entity word and a qualifier of the target query and an entity word and a qualifier of the each candidate expansion query; expanding the entity word and the qualifier of the target query and the entity word and the qualifier of the each candidate expansion query in combination with the knowledge graph; and matching using expansion results of the entity word and the qualifier of the target query and the entity word and the qualifier of the each candidate expansion query, to determine an expanded query of the target query from the candidate expansion query set.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:
1. A method for expanding a query, comprising:
counting a number of clicks on images associated with a target query in each of a plurality of preset time windows based on an acquired image click log associated with the target query;
constructing an image click characteristic vector based on the counted numbers of clicks, wherein the image click characteristic vector is a two-dimensional vector, one dimension represents the counted numbers of clicks, and other dimension represents the preset time windows;
finding, in a preset query set, a similar query of the target query based on the image click characteristic vector of the target query, to obtain a candidate expansion query set of the target query;

matching the target query and each candidate expansion query in the candidate expansion query set with an entity word and a qualifier in a knowledge graph, to extract an entity word and a qualifier of the target query and an entity word and a qualifier of the each candidate expansion query;

expanding the entity word of the target query and the entity word of the each candidate expansion query based on a knowledge structure relation between different entity words in the knowledge graph, taking an entity word having a close structure relation with the entity word of the target query and the entity word of the each candidate expansion query, as an expanded entity word of the target query and an expanded entity word of the each candidate expansion query, expanding the qualifier of the target query, and the entity word and the qualifier of the each candidate expansion query in combination with the knowledge graph; and matching using expansion results of the entity word and the qualifier of the target query and the entity word and the qualifier of the each candidate expansion query, to determine an expanded query of the target query from the candidate expansion query set.

2. The method according to claim 1, wherein the constructing comprises:
sanitizing a number of clicks less than a preset click threshold in a counting result, and constructing the image click characteristic vector based on sanitized numbers of clicks on the images associated with the target query in the each preset time window after the sanitizing.

3. The method according to claim 1, wherein the finding, in a preset query set, a similar query of the target query based on the image click characteristic vector of the target query to obtain a candidate expansion query set of the target query comprises:
counting, for each query in the preset query set, a number of clicks on an image associated with the query to construct an image click characteristic vector of the each query in the preset query set;
calculating a similarity between the image click characteristic vector of the each query in the preset query set and the image click characteristic vector of the target query; and
using a query corresponding to an image click characteristic vector having a similarity to the image click characteristic vector of the target query greater than a preset similarity threshold as a candidate expansion query to form the candidate expansion query set.

4. The method according to claim 1, wherein the matching the target query and each candidate expansion query in the candidate expansion query set with an entity word and a qualifier in a knowledge graph to extract an entity word and a qualifier of the target query and an entity word and a qualifier of the each candidate expansion query comprises:
performing word segmentation on the target query and the each candidate expansion query in the candidate expansion query set;
matching words obtained by the word segmentation with the entity word in the knowledge graph to obtain the entity word of the target query and the entity word of the each candidate expansion query; and
matching the words obtained by the word segmentation with a qualifier of the entity word in the knowledge graph to obtain the qualifier of the target query and the qualifier of the each candidate expansion query.

5. The method according to claim 1, wherein the expanding the qualifier of the target query comprises:
matching the qualifier of the target query and the qualifier of the each candidate expansion query with an associated qualifier set constructed based on the knowledge structure relation in the knowledge graph, to obtain an expanded qualifier of the target query and an expanded qualifier of the each candidate expansion query.

6. The method according to claim 5, wherein the knowledge graph comprises knowledge graphs of a plurality of domain categories; and
the expanding the qualifier of the target query further comprises:
determining a target domain category of the knowledge graph matching the entity word of the target query and the entity word of the each candidate expansion query,
wherein the expanding the entity word of the target query and the entity word of the each candidate expansion query based on a knowledge structure relation between different entity words in the knowledge graph comprises:
expanding the entity word of the target query and the entity word of the each candidate expansion query based on a knowledge structure relation between different entity words in the knowledge graph of the target domain category; and
the matching the qualifier of the target query and the qualifier of the each candidate expansion query with an associated qualifier set constructed based on the knowledge structure relation in the knowledge graph comprises:
matching the qualifier of the target query and the qualifier of the each candidate expansion query with the associated qualifier set constructed based on the knowledge structure relation in the knowledge graph of the target domain category.

7. The method according to claim 5, wherein the matching using expansion results of the entity word and the qualifier of the target query and the entity word and the qualifier of the each candidate expansion query to determine an expanded query of the target query from the candidate expansion query set comprises:
using a candidate expansion query having an entity word identical to the expanded entity word of the target query and/or a qualifier identical to the expanded qualifier of the target query in the candidate expansion query set as the expanded query of the target query.

8. An apparatus for expanding a query, comprising:
at least one processor; and
a memory storing instructions, the instructions when executed by the at least one processor, cause the at least one processor to perform operations, the operations comprising:
counting a number of clicks on images associated with a target query in each of a plurality of preset time windows based on an acquired image click log associated with the target query;
constructing an image click characteristic vector based on the counted numbers of clicks, wherein the image click characteristic vector is a two-dimensional vector, one dimension represents the counted numbers of clicks, and other dimension represents the preset time windows;
finding, in a preset query set, a similar query of the target query based on the image click characteristic vector of the target query, to obtain a candidate expansion query set of the target query;

matching the target query and each candidate expansion query in the candidate expansion query set with an entity word and a qualifier in a knowledge graph, to extract an entity word and a qualifier of the target query and an entity word and a qualifier of the each candidate expansion query;

expanding the entity word of the target query and the entity word of the each candidate expansion query based on a knowledge structure relation between different entity words in the knowledge graph, taking an entity word having a close structure relation with the entity word of the target query and the entity word of the each candidate expansion query, as an expanded entity word of the target query and an expanded entity word of the each candidate expansion query, expanding the qualifier of the target query, and the entity word and the qualifier of the each candidate expansion query in combination with the knowledge graph; and matching using expansion results of the entity word and the qualifier of the target query, and the entity word and the qualifier of the each candidate expansion query, to determine an expanded query of the target query from the candidate expansion query set.

9. The apparatus according to claim 8, wherein the constructing comprises:

sanitizing a number of clicks less than a preset click threshold in a counting result, and constructing the image click characteristic vector based on sanitized numbers of clicks on the images associated with the target query in the each preset time window after the sanitizing.

10. The apparatus according to claim 8, wherein the finding, in a preset query set, a similar query of the target query based on the image click characteristic vector of the target query to obtain a candidate expansion query set of the target query comprises:

counting, for each query in the preset query set, a number of clicks on an image associated with the query to construct an image click characteristic vector of the each query in the preset query set;

calculating a similarity between the image click characteristic vector of the each query in the preset query set and the image click characteristic vector of the target query; and using a query corresponding to an image click characteristic vector having a similarity to the image click characteristic vector of the target query greater than a preset similarity threshold as a candidate expansion query to form the candidate expansion query set.

11. The apparatus according to claim 8, wherein the matching the target query and each candidate expansion query in the candidate expansion query set with an entity word and a qualifier in a knowledge graph to extract an entity word and a qualifier of the target query and an entity word and a qualifier of the each candidate expansion query comprises:

performing word segmentation on the target query and the each candidate expansion query in the candidate expansion query set;

matching words obtained by the word segmentation with the entity word in the knowledge graph to obtain the entity word of the target query and the entity word of the each candidate expansion query; and matching the words obtained by the word segmentation with a qualifier of the entity word in the knowledge graph to obtain the qualifier of the target query and the qualifier of the each candidate expansion query.

12. The apparatus according to claim 8, wherein the expanding the qualifier of the target query comprises:

matching the qualifier of the target query and the qualifier of the each candidate expansion query with an associated qualifier set constructed based on the knowledge structure relation in the knowledge graph, to obtain an expanded qualifier of the target query and an expanded qualifier of the each candidate expansion query.

13. The apparatus according to claim 12, wherein the knowledge graph comprises knowledge graphs of a plurality of domain categories;

the expanding the qualifier of the target query further comprises:

determining a target domain category of the knowledge graph matching the entity word of the target query and the entity word of the each candidate expansion query, wherein the expanding the entity word of the target query and the entity word of the each candidate expansion query based on a knowledge structure relation between different entity words in the knowledge graph comprises:

expanding the entity word of the target query and the entity word of the each candidate expansion query based on a knowledge structure relation between different entity words in the knowledge graph of the target domain category; and the matching the qualifier of the target query and the qualifier of the each candidate expansion query with an associated qualifier set constructed based on the knowledge structure relation in the knowledge graph comprises:

matching the qualifier of the target query and the qualifier of the each candidate expansion query with the associated qualifier set constructed based on the knowledge structure relation in the knowledge graph of the target domain category.

14. The apparatus according to claim 12, wherein the matching using expansion results of the entity word and the qualifier of the target query and the entity word and the qualifier of the each candidate expansion query to determine an expanded query of the target query from the candidate expansion query set comprises:

using a candidate expansion query having an entity word identical to the expanded entity word of the target query and/or a qualifier identical to the expanded qualifier of the target query in the candidate expansion query set as the expanded query of the target query.

15. A non-transitory computer storage medium storing a computer program, the computer program when executed by one or more processors, causes the one or more processors to perform operations, the operations comprising:

counting a number of clicks on images associated with a target query in each of a plurality of preset time windows based on an acquired image click log associated with the target query;

constructing an image click characteristic vector based on the counted numbers of clicks, wherein the image click characteristic vector is a two-dimensional vector, one dimension represents the counted numbers of clicks, and other dimension represents the preset time windows;

finding, in a preset query set, a similar query of the target query based on the image click characteristic vector of the target query, to obtain a candidate expansion query set of the target query;

matching the target query and each candidate expansion query in the candidate expansion query set with an entity word and a qualifier in a knowledge graph, to extract an entity word and a qualifier of the target query and an entity word and a qualifier of the each candidate expansion query;

expanding the entity word of the target query and the entity word of the each candidate expansion query based on a knowledge structure relation between different entity words in the knowledge graph, taking an entity word having a close structure relation with the entity word of the target query and the entity word of the each candidate expansion query, as an expanded entity word of the target query and an expanded entity word of the each candidate expansion query, expanding the qualifier of the target query, and the entity word and the qualifier of the each candidate expansion query in combination with the knowledge graph; and matching using expansion results of the entity word and the qualifier of the target query and the entity word and the qualifier of the each candidate expansion query, to determine an expanded query of the target query from the candidate expansion query set.

\* \* \* \* \*